United States Patent
Wen et al.

(10) Patent No.: US 9,858,205 B2
(45) Date of Patent: Jan. 2, 2018

(54) SYSTEMS AND METHODS FOR CACHE MANAGEMENT FOR UNIVERSAL SERIAL BUS SYSTEMS

(71) Applicant: Marvell World Trade Ltd., St. Michael (BB)

(72) Inventors: Xingzhi Wen, Fremont, CA (US); Yu Hong, Shanghai (CN); Hefei Zhu, Shanghai (CN); Qunzhao Tian, Shanghai (CN); Jeanne Q. Cai, Fremont, CA (US); Shaori Guo, San Jose, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 15/343,997

(22) Filed: Nov. 4, 2016

(65) Prior Publication Data

US 2017/0052904 A1 Feb. 23, 2017

Related U.S. Application Data

(63) Continuation of application No. 14/297,793, filed on Jun. 6, 2014, now Pat. No. 9,489,311.

(Continued)

(51) Int. Cl.
| | | |
|---|---|---|
| *G06F 12/12* | (2016.01) | |
| *G06F 12/123* | (2016.01) | |
| *G06F 12/0862* | (2016.01) | |
| *G06F 12/0868* | (2016.01) | |
| *G06F 12/0875* | (2016.01) | |
| *G06F 12/121* | (2016.01) | |

(52) U.S. Cl.
CPC ........ *G06F 12/123* (2013.01); *G06F 12/0862* (2013.01); *G06F 12/0868* (2013.01); *G06F 12/0875* (2013.01); *G06F 12/121* (2013.01); *G06F 2212/1008* (2013.01); *G06F 2212/2146* (2013.01); *G06F 2212/608* (2013.01)

(58) Field of Classification Search
CPC ........... G06F 2212/69; G06F 2212/608; G06F 2212/1008; G06F 12/12; G06F 12/0868; G06F 12/123; G06F 12/0875; G06F 12/0862; G06F 2212/2146
USPC ........................................ 711/133, 108, 135
See application file for complete search history.

(56) References Cited

U.S. PATENT DOCUMENTS

| | | |
|---|---|---|
| 7,480,739 B1 | 1/2009 | Berendsen |
| 2001/0001873 A1 | 5/2001 | Wickeraad et al. |

(Continued)

OTHER PUBLICATIONS

European Search Report dated Jan. 31, 2017 from related/corresponding European Patent Appl. No. 14817716.5, filed Dec. 1, 2015.

(Continued)

*Primary Examiner* — Jasmine Song

(57) ABSTRACT

A system includes a cache and a cache-management component. The cache includes a plurality of cache lines that correspond to a plurality of device endpoints. The cache-management component is configured to receive a transfer request block (TRB) for data transfer involving a device endpoint. In response to a determination that the cache both (i) does not include a cache line assigned to the device endpoint and (ii) does not include an empty cache line, the cache-management component assigns, to the device endpoint, a last cache line that includes a most recently received TRB in the cache, and stores the received TRB to the last cache line.

18 Claims, 9 Drawing Sheets

Related U.S. Application Data

(60) Provisional application No. 61/832,207, filed on Jun. 7, 2013.

(56) References Cited

U.S. PATENT DOCUMENTS

| | | |
|---|---|---|
| 2006/0143333 A1 | 6/2006 | Minturn et al. |
| 2011/0066812 A1 | 3/2011 | Qin et al. |
| 2013/0185517 A1 | 7/2013 | Elboim |

OTHER PUBLICATIONS

International Search Report and Written Opinion dated Mar. 6, 2015 in related/corresponding PCT Patent Appl. No. PCT/IB2014/002123, which was filed Jun. 6, 2014.

(A)

(B)

SYSTEMS AND METHODS FOR CACHE MANAGEMENT FOR UNIVERSAL SERIAL BUS SYSTEMS

CROSS-REFERENCE TO RELATED APPLICATIONS

This is a continuation of U.S. application Ser. No. 14/297,793, filed Jun. 6, 2014, which claims priority from U.S. Provisional Application No. 61/832,207, filed Jun. 7, 2013, both applications hereby incorporated herein by reference.

FIELD

The technology described in this patent document relates generally to storage medium and more particularly to cache management.

BACKGROUND

Universal Serial Bus (USB) is widely used for data transfer between a host and a peripheral device (i.e., a USB device). In a USB system, the data transfer between the host and the peripheral device is controlled by a host controller, and the communication between the host controller and the host is specified in a host controller interface (HCI), e.g., "eXtensible Host Controller Interface for Universal Serial Bus (xHCI)."

Usually, the host controller executes USB operations to move data between host memory and device endpoints, where each device endpoint corresponds to a uniquely addressable portion of a USB device that is the source or sink of data in a communication flow between the host and the USB device. The host controller may use certain data structures, such as transfer request blocks (TRBs), for USB operations. For example, transfers to and from a device endpoint of a USB device are defined using a transfer descriptor (TD) which includes one or more TRBs. TDs are often managed through one or more transfer rings (i.e., circular queues of TDs) that reside in the host memory, and each transfer ring corresponds to an active device endpoint of a USB device. FIG. 1 depicts an example transfer ring that includes eight TRBs. Command rings and event rings that include a number of TRBs may also be used by the host controller for USB operations.

SUMMARY

In accordance with the teachings described herein, systems and methods are provided for cache management. An example system includes a cache and a cache-management component. The cache includes a plurality of cache lines corresponding to a plurality of device endpoints, a device endpoint including a portion of a universal-serial-bus (USB) device. The cache-management component is configured to receive one or more first transfer request blocks (TRBs) for data transfer involving a first device endpoint and determine whether a cache line in the cache is assigned to the first device endpoint. The cache-management component is further configured to, in response to no cache line in the cache being assigned to the first device endpoint, determine whether the cache includes an empty cache line that contains no valid TRBs, and in response to the cache including an empty cache line, assign the empty cache line to the first device endpoint and store the one or more first TRBs to the empty cache line. In addition, the cache-management component is configured to, in response to the cache not including an empty cache line, assign a predetermined cache line to the first device endpoint and store the one or more first TRBs to the predetermined cache line.

In one embodiment, a method is provided for cache management. One or more first transfer request blocks (TRBs) for data transfer involving a first device endpoint are received, the first device endpoint including a portion of a first universal-serial-bus (USB) device. Whether a cache line in a cache is assigned to the first device endpoint is determined, the cache including a plurality of cache lines corresponding to a plurality of device endpoints. In response to no cache line being assigned to the first device endpoint, whether the cache includes an empty cache line that contains no valid TRBs is determined. In response to the cache including an empty cache line, the empty cache line is assigned to the first device endpoint, and the one or more first TRBs are stored to the empty cache line. In response to the cache not including an empty cache line, a predetermined cache line is assigned to the first device endpoint, and the one or more first TRBs are stored to the predetermined cache line.

In another embodiment, a non-transitory computer readable storage medium includes programming instructions for cache management. The programming instructions are configured to cause one or more data processors to execute certain operations. One or more first transfer request blocks (TRBs) for data transfer involving a first device endpoint are received, the first device endpoint including a portion of a first universal-serial-bus (USB) device. Whether a cache line in a cache is assigned to the first device endpoint is determined, the cache including a plurality of cache lines corresponding to a plurality of device endpoints. In response to no cache line being assigned to the first device endpoint, whether the cache includes an empty cache line that contains no valid TRBs is determined. In response to the cache including an empty cache line, the empty cache line is assigned to the first device endpoint, and the one or more first TRBs are stored to the empty cache line. In response to the cache not including an empty cache line, a predetermined cache line is assigned to the first device endpoint, and the one or more first TRBs are stored to the predetermined cache line.

DETAILED DESCRIPTION

In a USB system, a host controller often reads TRBs directly from host memory for data transfer between the host and a device endpoint. Latency of host memory access (e.g., tens of microseconds to a few milliseconds) usually negatively affects the system performance. A cache with shorter access latency can be used to pre-fetch and store a number of TRBs from the host memory. As such, the host controller may read a TRB directly from the cache, instead of the host memory, to improve the system performance. However, the volume of a cache is often limited, while a large number of rings (e.g., transfer rings) may exist in the host memory. Thus, a cache-management mechanism may be needed to effectively use the cache for data transfer associated with the large number of rings.

Figure 1:
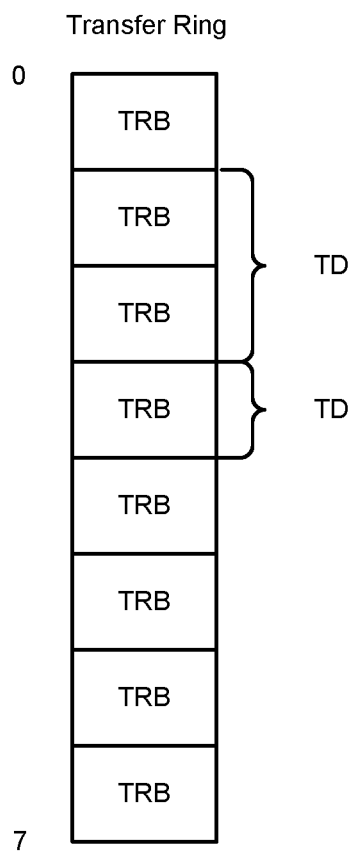
FIG. 1 depicts an example transfer ring that includes eight TRBs.
Figure 2:
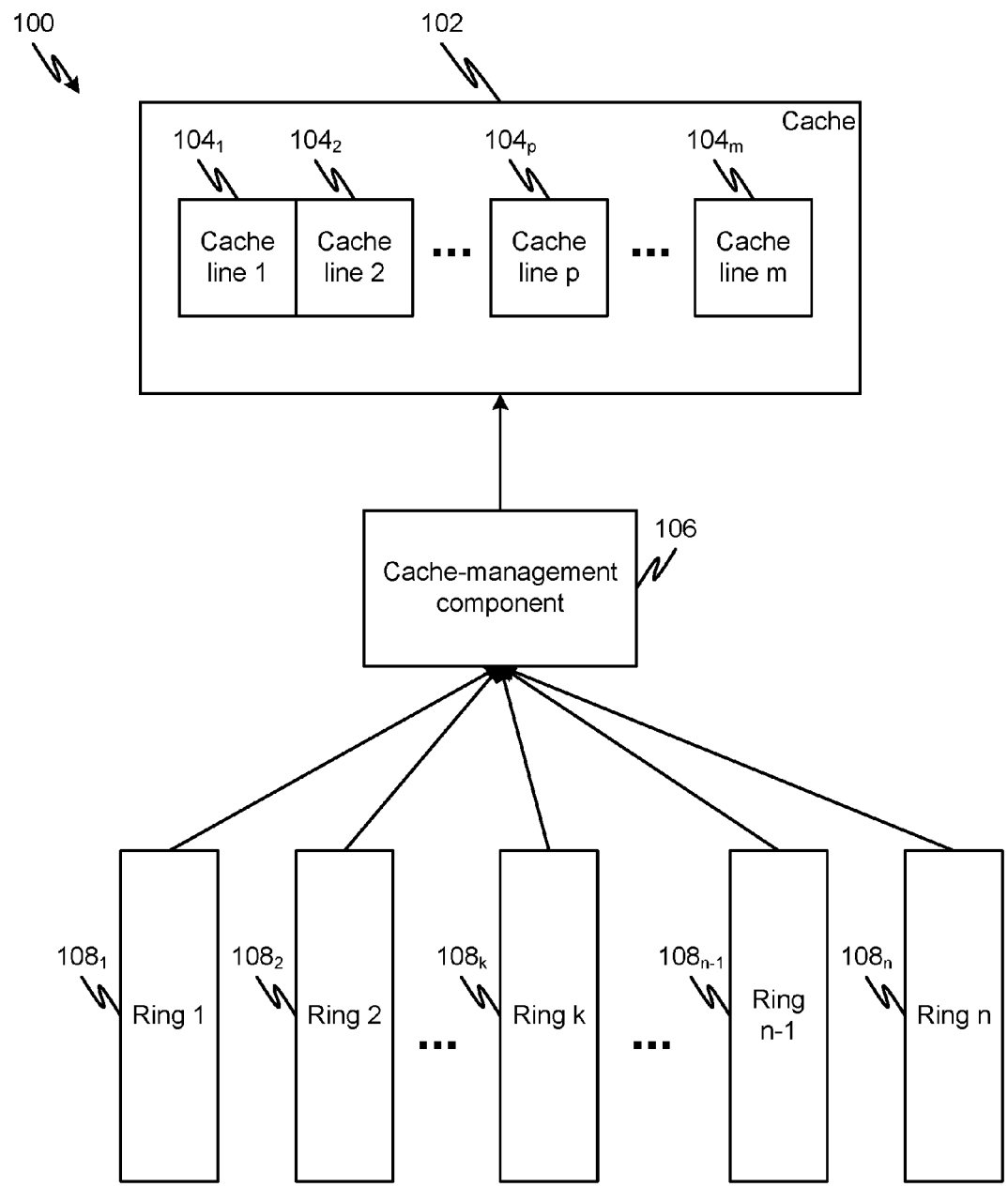
FIG. 2 depicts an example TRB cache system.

FIG. 2 depicts an example TRB cache system. As shown in FIG. 2, the TRB cache system 100 implements a cache 102 that includes a number of cache lines $104_1$, $104_2$, ..., and $104_m$ (m is a positive integer). A cache-management component 106 pre-fetches one or more TRBs from a particular ring $108_k$ (n≥k≥1), determines a cache line for the ring $108_k$ based on a cache-management algorithm, and stores the pre-fetched TRBs to the determined cache line.

Specifically, each of the rings $108_1$, $108_2$, ..., and $108_n$ corresponds to a device endpoint of a USB device. The cache-management component 106 pre-fetches one or more TRBs (e.g., a TD) from the ring $108_k$ that corresponds to a particular device endpoint. For example, a TRB is constructed in memory to transfer a single physically contiguous block of data between host memory and a host controller (not shown in FIG. 2). A TRB may include 4 double words or 16 bytes and contain a data buffer pointer, a size of the data buffer and control information. For simple single-buffer operations, a single TRB corresponds to a TD, and for large multi-buffer operations, multiple TRBs may be chained to form a complex TD. For example, a plurality of rings may correspond to different device endpoints of a single USB device.

Figure 3:
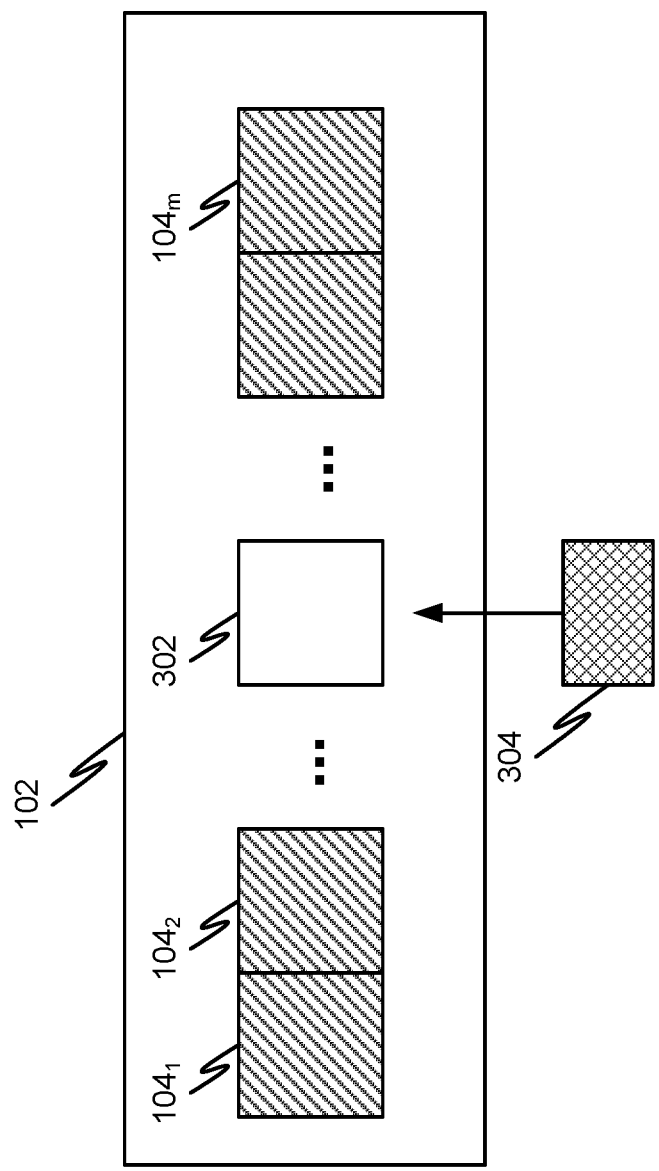
FIG. 3-FIG. 5 depict example diagrams showing cache-management mechanisms.
Figure 4:
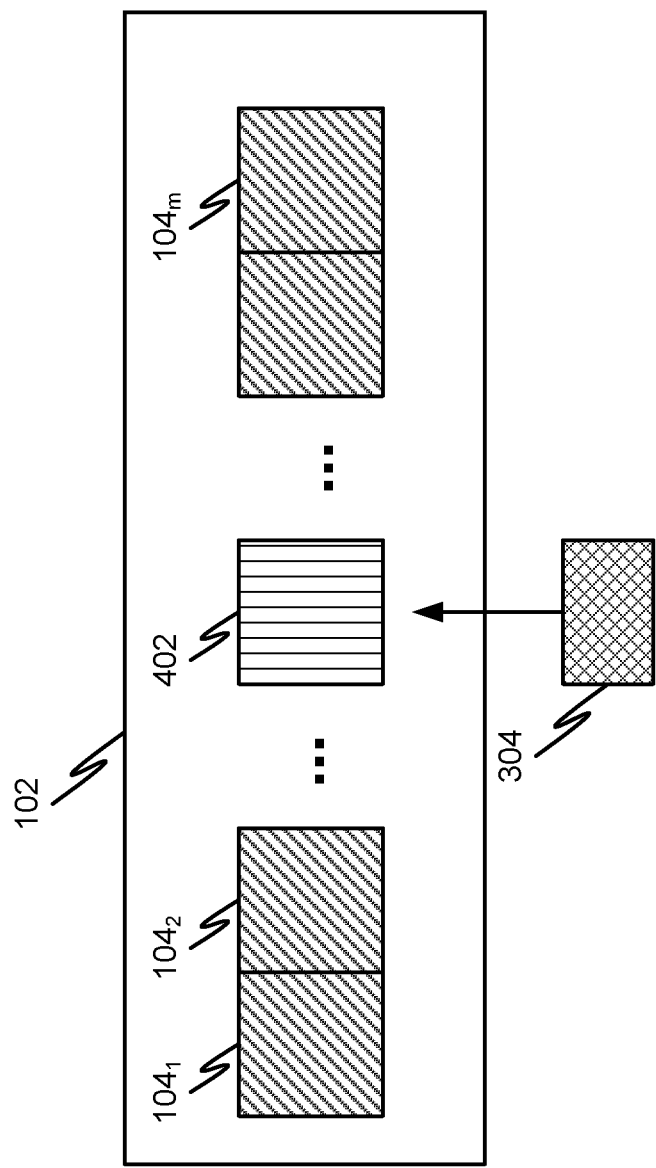

The cache-management component 106 may search for a cache line in the cache 102 that has already been assigned to the ring $108_k$. If a cache line that has been assigned to the ring $108_k$ is located, the cache-management component 106 stores the pre-fetched TRBs to the cache line previously assigned to the ring $108_k$. If no cache line has been assigned to the ring $108_k$, the cache-management component 106 may search for an empty cache line which does not include any valid TRBs. For example, all TRBs in the empty cache line are invalid. As shown in FIG. 3, the empty cache line 302 is located, and the cache-management component 106 assigns the empty cache line 302 to the ring $108_k$ and stores the pre-fetched TRBs 304 to the empty cache line 302. For example, a hit rate associated with storing the pre-fetched TRBs to the empty cache line is approximately 100%.

Figure 5:
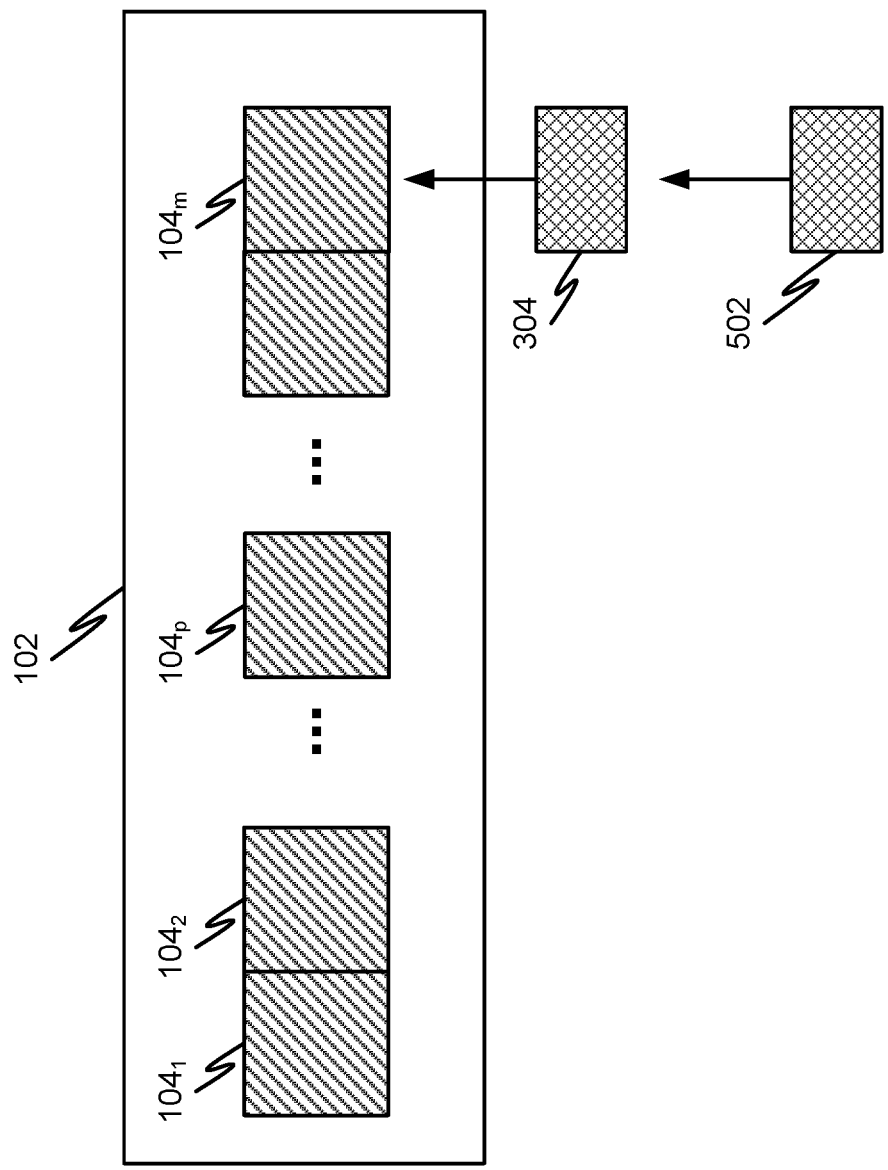

If no empty cache line is located in the cache 102, the cache-management component 106 may assign a predetermined cache line 402 to the ring $108_k$ and store the pre-fetched TRBs 304 to the predetermined cache line 402. In certain embodiments, the predetermined cache line may be a control cache line corresponding to a control endpoint which is used for control transfer related to command or status operations. In some embodiments, the predetermined cache line corresponds to a most-recently-used cache line that has been accessed recently. As shown in FIG. 5, the cache line $104_m$ is determined to be the most-recently-used cache line, and then the cache-management component 106 assigns the cache line $104_m$ to the ring $108_k$ and stores the pre-fetched TRBs 304 to the cache line $104_m$. In addition, the cache-management component 106 pre-fetches one or more TRBs 502 from another ring, and determines the cache line 104 corresponds to the most-recently-used cache line. Thus, the cache-management component 106 stores the pre-fetched TRBs 502 to the cache line $104_m$ to replace the TRBs 304 previously stored in the cache line $104_m$. For example, if there are 100 rings in the host memory and 32 cache lines in the cache 102, a hit rate associated with storing pre-fetched TRBs to a predetermined cache line is approximately 31/100.

In an embodiment, a cache-management component receives one or more first TRBs for data transfer involving a first device endpoint. In response to no cache line in the cache being assigned to the first device endpoint and the cache not including an empty cache line, the cache-management component assigns a predetermined cache line to the first device endpoint and stores the one or more first TRBs to the predetermined cache line. The predetermined cache line may correspond to a last cache line that includes one or more second TRBs most recently received before the first TRBs, and the cache-management component may store the one or more first TRBs to the predetermined cache line to replace the one or more second TRBs.

Figure 6:
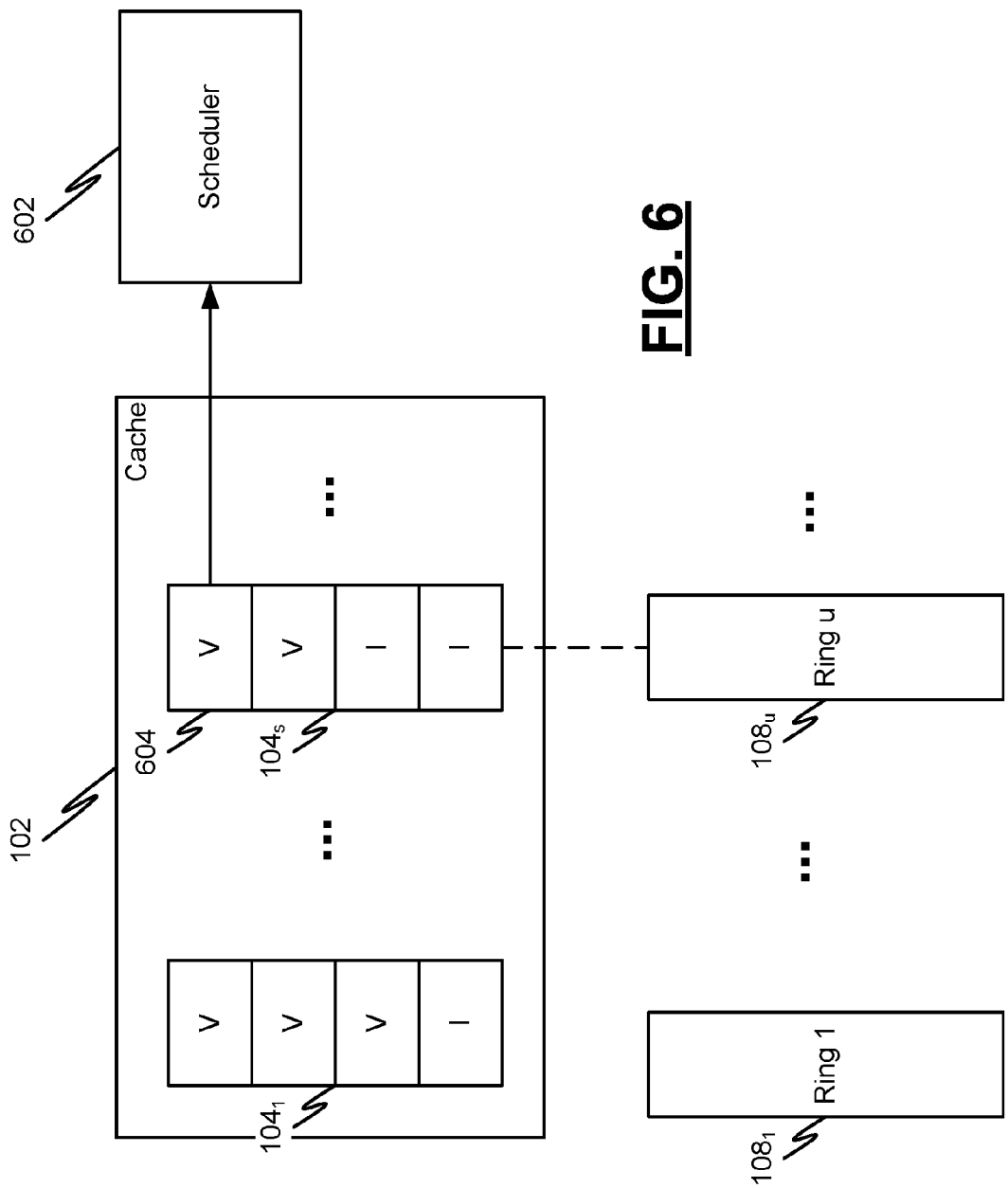
FIG. 6 depicts an example diagram showing a scheduler retrieving a TRB from a cache.

FIG. 6 depicts an example diagram showing a scheduler retrieving a TRB from the cache 102. As shown in FIG. 6, the scheduler 602 requests a TRB of a ring $108_u$. A cache line $104_s$ in the cache 102 has been assigned to the ring $108_u$, and one or more TRBs have been pre-fetched from the ring $108_u$ and stored in the cache line $104_s$. As shown in FIG. 6, the cache line $104_s$ includes two valid TRBs and two invalid TRBs. A single valid TRB 604 is retrieved from the cache line $104_s$ and sent to the scheduler 602 for data transfer involving a device endpoint that corresponds to the ring $108_u$.

Figure 7A:
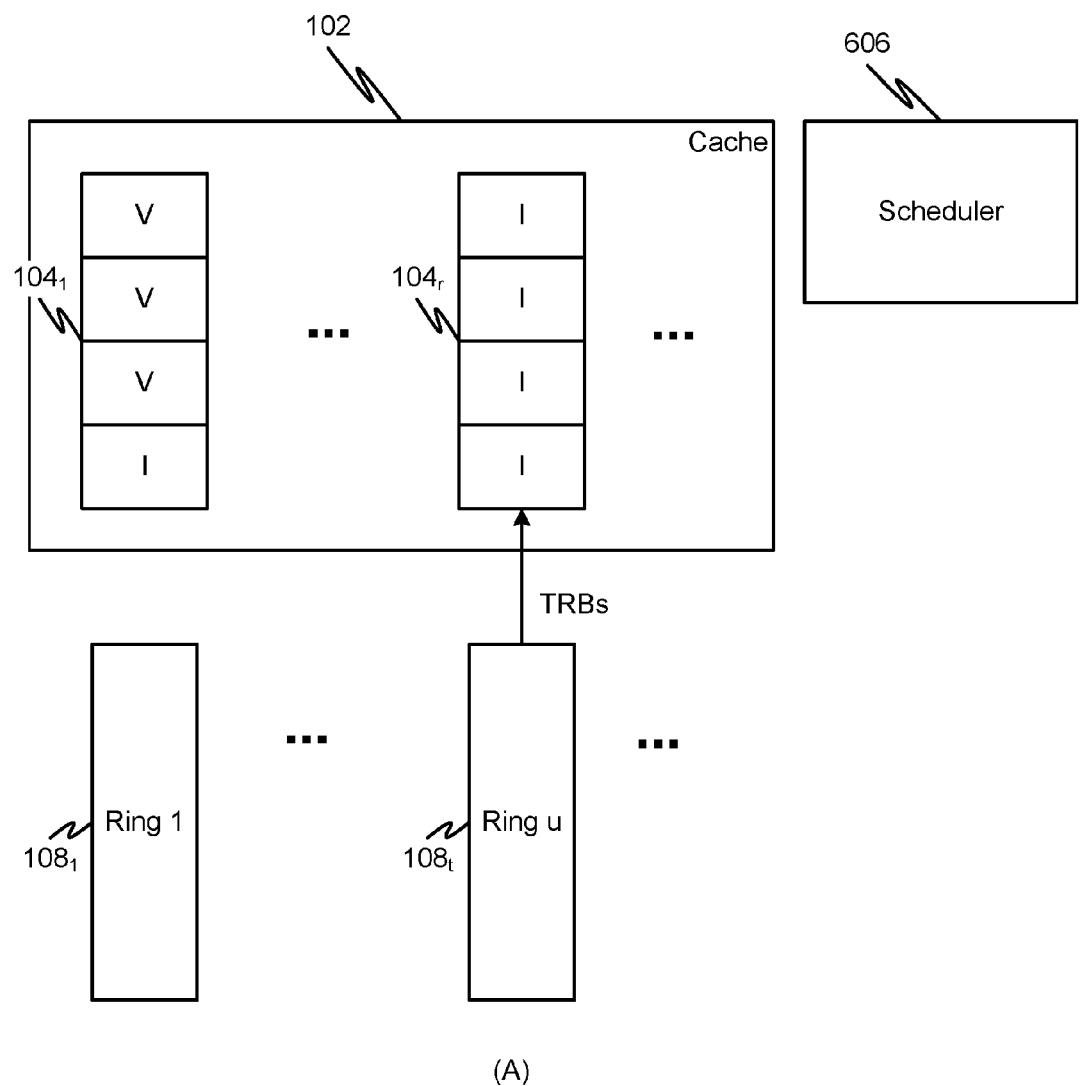
FIG. 7(A) and FIG. 7(B) depict other example diagrams showing a scheduler retrieving a TRB from a cache.
Figure 7B:
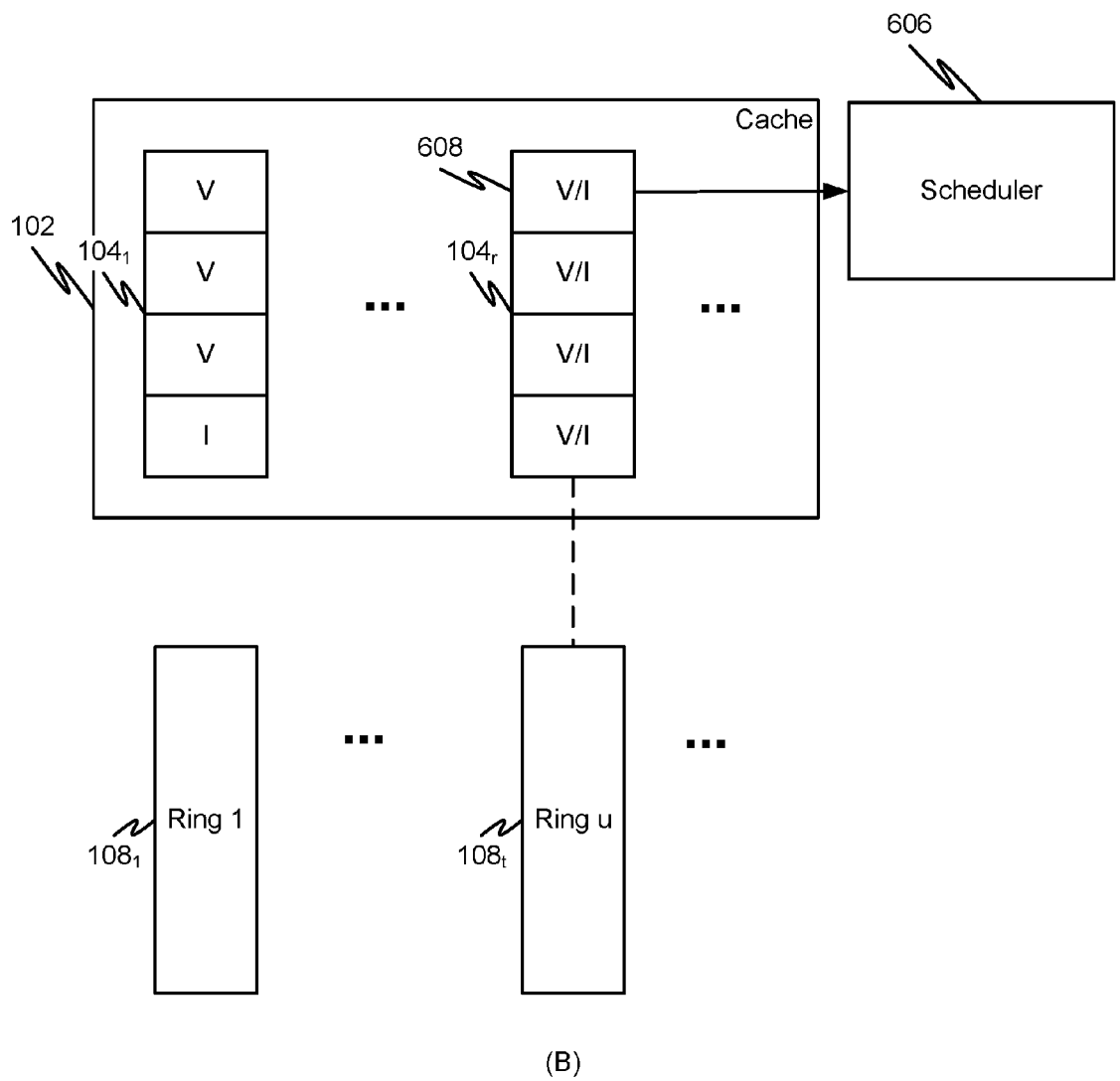

FIG. 7(A) and FIG. 7(B) depict other example diagrams showing a scheduler retrieving a TRB from the cache 102. As shown in FIG. 7(A), the scheduler 606 requests a TRB of a ring $108_t$, and a cache line $104_r$ in the cache 102 has been assigned to the ring $108_t$. However, the TRBs contained in the cache line $104_r$ are all invalid. That is, the cache line $104_r$ corresponds to an empty cache line. One or more TRBs (e.g., four TRBs) can be fetched from the ring $108_t$ and stored in the cache line $104_r$. As shown in FIG. 7(B), a single TRB 608 (e.g., valid or invalid) is then retrieved from the cache line $104_r$ and sent to the scheduler 606 for data transfer involving a device endpoint that corresponds to the ring $108_t$.

Figure 8:
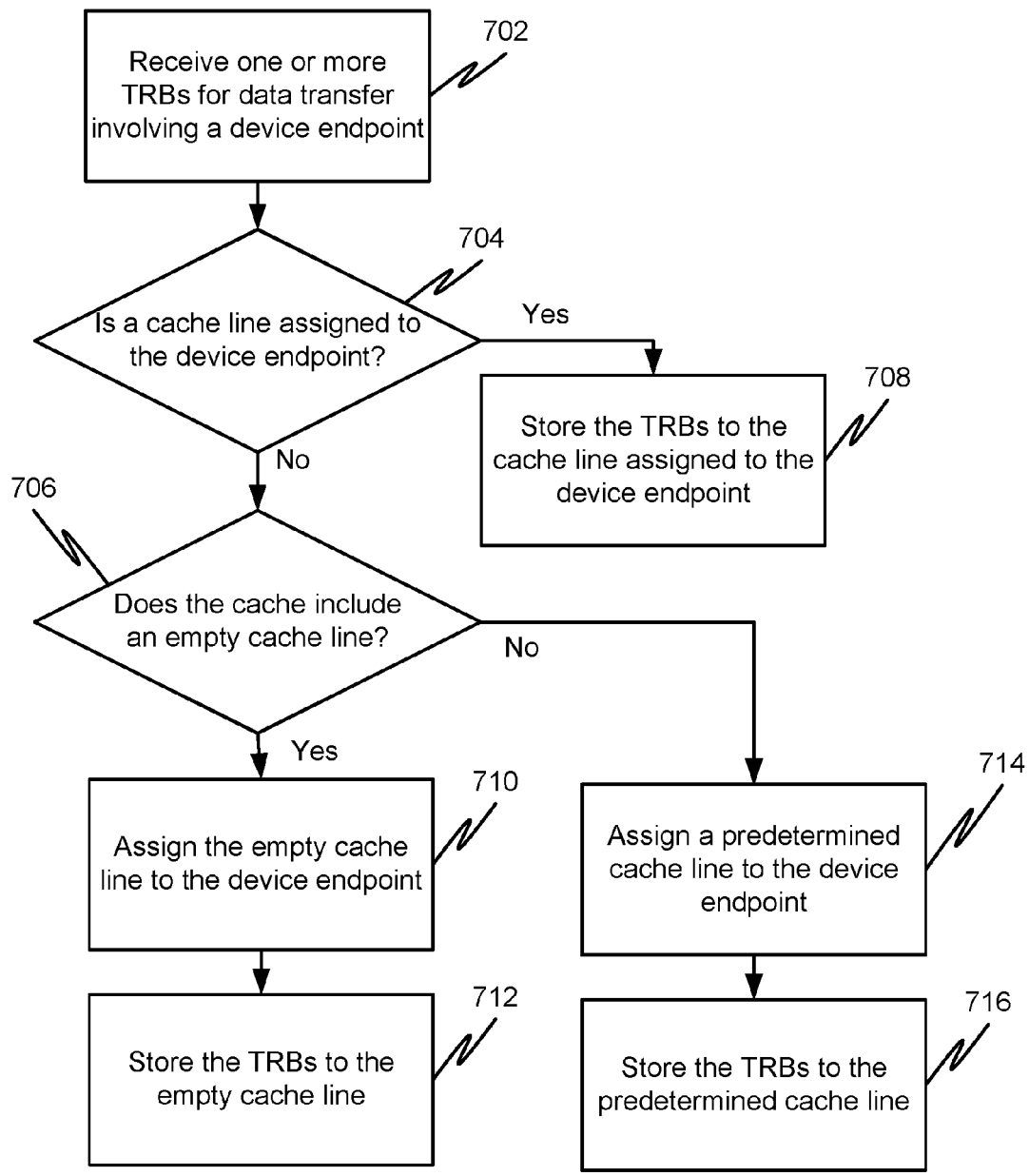
FIG. 8 depicts an example flow diagram for cache management.

FIG. 8 depicts an example diagram showing a method for cache management. At 702, one or more transfer request blocks (TRBs) for data transfer involving a device endpoint. The device endpoint includes a portion of a universal-serial-bus (USB) device. At 704, whether a cache line in a cache is assigned to the device endpoint is determined. The cache includes a plurality of cache lines corresponding to a plurality of device endpoints. If a cache line assigned to the device endpoint is located, at 708, the one or more first TRBs are stored to the cache line assigned to the device endpoint. If no cache line has been assigned to the device endpoint, at 706, whether the cache includes an empty cache line that contains no valid TRBs is determined. If the cache includes an empty cache line, at 710, the empty cache line is assigned to the first device endpoint. At 712, the one or more first TRBs are stored to the empty cache line. If the cache does not include an empty cache line, at 714, a predetermined cache line is assigned to the first device endpoint. At 716, the one or more first TRBs are stored to the predetermined cache line.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

The invention claimed is:

1. A system comprising:
   a cache including a plurality of cache lines that correspond to a plurality of device endpoints; and
   a cache-management component configured to
      receive a transfer request block (TRB) for data transfer involving a device endpoint;
      in response to a determination that the cache both (i) does not include a cache line assigned to the device endpoint and (ii) does not include an empty cache line,
         assign, to the device endpoint, a last cache line that includes a most recently received TRB in the cache; and
         store the received TRB to the last cache line to replace the most recently received TRB.

2. The system of claim 1, wherein the plurality of device endpoints respectively include a portion of a universal-serial-bus (USB) device.

3. The system of claim 1, wherein the last cache line corresponds to a control cache line that is previously assigned to a control endpoint.

4. The system of claim 3, wherein the last cache line corresponds to a control endpoint used for control transfer related to command and status operations.

5. The system of claim 1, further comprising:
   a scheduler configured to retrieve the TRB from the cache for data transfer involving the device endpoint.

6. The system of claim 1, wherein the cache-management component is further configured to, in response to a cache line assigned to the device endpoint being located, store the TRB to the assigned cache line.

7. The system of claim 6, wherein the cache-management component is further configured to store the TRB to the assigned cache line to replace a TRB previously stored in the assigned cache line.

8. A method comprising:
   providing a cache including a plurality of cache lines that correspond to a plurality of device endpoints;
   receiving a transfer request block (TRB) for data transfer involving a device endpoint;
   determining that the cache both (i) does not include a cache line assigned to the device endpoint and (ii) does not include an empty cache line;
   in response to the determination,
      assigning, to the device endpoint, a last cache line that includes a most recently received TRB in the cache; and
      storing the received TRB to the last cache line to replace the most recently received TRB.

9. The method of claim 8, wherein the plurality of device endpoints respectively include a portion of a universal-serial-bus (USB) device.

10. The method of claim 8, wherein the last cache line corresponds to a control cache line that is previously assigned to a control endpoint.

11. The method of claim 10, wherein the last cache line corresponds to a control endpoint used for control transfer related to command and status operations.

12. The method of claim 8, further comprising:
    retrieving the TRB from the cache for data transfer involving the device endpoint.

13. The method of claim 8, further comprising:
    in response to a cache line assigned to the device endpoint being located, storing the TRB to the assigned cache line.

14. The method of claim 13, further comprising:
    storing the TRB to the assigned cache line to replace a TRB previously stored in the assigned cache line.

15. A non-transitory processor readable storage medium storing instructions configured to be executed by one or more data processors to perform operations with a cache that includes a plurality of cache lines that correspond to a plurality of device endpoints, the operations comprising:
    receiving a transfer request block (TRB) for data transfer involving a device endpoint;
    determining that the cache both (i) does not include a cache line assigned to the device endpoint and (ii) does not include an empty cache line;
    in response to the determination,
       assigning, to the device endpoint, a last cache line that includes a most recently received TRB in the cache; and
       storing the received TRB to the last cache line to replace the most recently received TRB.

16. The non-transitory processor readable storage medium of claim 15, wherein the plurality of device endpoints respectively include a portion of a universal-serial-bus (USB) device.

17. The non-transitory processor readable storage medium of claim 15, wherein the last cache line corresponds to a control cache line that is previously assigned to a control endpoint.

18. The non-transitory processor readable storage medium of claim 17, wherein the last cache line corresponds to a control endpoint used for control transfer related to command and status operations.

* * * * *